United States Patent [19]

Cupler, II

[11] 3,966,277

[45] June 29, 1976

[54] VEE BEARING HAVING ADJUSTABLE V JOURNAL PROFILE

[76] Inventor: John A. Cupler, II, 10 Cupler Drive LaVale, Cumberland, Md. 21502

[22] Filed: Sept. 6, 1974

[21] Appl. No.: 503,749

[52] U.S. Cl. .......................... 308/36; 29/149.5 NM; 151/24
[51] Int. Cl.$^2$ .......................................... F16C 23/02
[58] Field of Search ....................... 308/3, 36, 63, 73; 151/24; 29/149.5, 568; 408/53

[56] References Cited
UNITED STATES PATENTS

| | | | |
|---|---|---|---|
| 1,111,732 | 9/1914 | Breault | 151/24 |
| 2,616,475 | 11/1952 | Koza | 151/24 |
| 3,106,117 | 10/1963 | Duguesnel | 308/3 |
| 3,472,704 | 10/1969 | Watson et al. | 308/241 |
| 3,537,762 | 11/1970 | Lodige | 308/3 |
| 3,679,273 | 7/1972 | Cupler | 308/36 |

Primary Examiner—M. H. Wood, Jr.
Assistant Examiner—Richard A. Bertsch
Attorney, Agent, or Firm—Colton & Stone, Inc.

[57] ABSTRACT

The disclosure relates to method and apparatus for adjusting the V journal profile of a Vee bearing. The purposes are to make possible, in a Vee bearing, the interchange of different cylindrical profiles for rotation and/or reciprocation along a primary journal axis and to expand the range of a conventional Vee bearing function in the use of the same to perform multiple machining operations along spaced, parallel centerlines without the necessity of repositioning either the workpiece or bearing.

A Vee bearing includes spaced pairs of bearing elements which define a V journal profile and the foregoing is achieved by like movement of all the bearing elements toward or away from the journal axis to adjust the V journal profile.

8 Claims, 9 Drawing Figures

FIG. 3
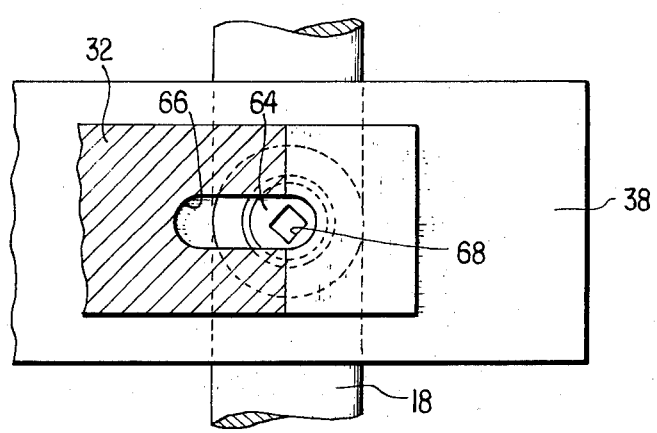
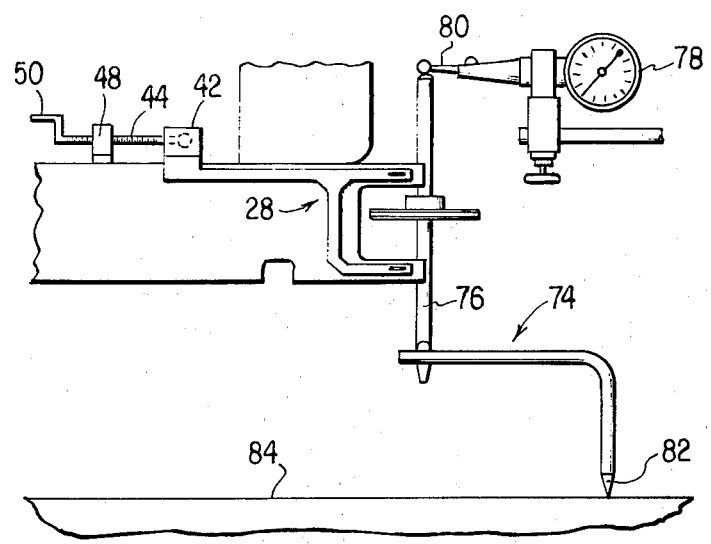
FIG. 4
FIG. 5
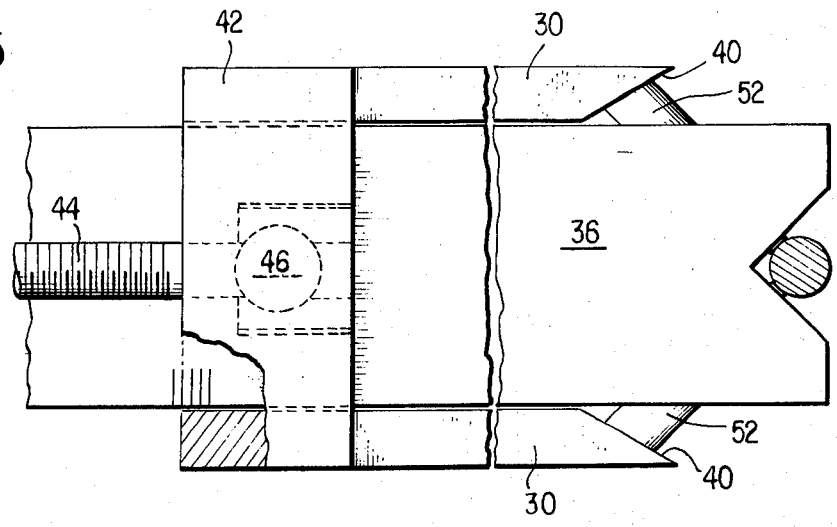

3,966,277

VEE BEARING HAVING ADJUSTABLE V JOURNAL PROFILE

BACKGROUND OF THE INVENTION

Conventional Vee bearings, by definition, provide spaced pairs of line contact bearing elements against which a semi-cylindrical area of a cylindrical profile, such as a tool or workpiece, is biased for rotation and/or reciprocating infeeding motion relative thereto. The pair spacing is along the axis of the cylindrical profile with the line contact bearing elements of each pair spaced less than 180° about the cylindrical profile to be biased thereagainst, i.e., each pair bears against the same semi-cylindrical surface area of the journaled cylindrical profile. Accordingly, rotation or reciprocation of the cylindrical profile will necessarily occur about or along a bearing or journal axis concentric with its cylindrical surface subject only to the requirement that the cylindrical surface be maintained in constant engagement with the line contact bearing elements.

The universally recognized advantage in the use of Vee bearings is that they are a fixed part of a static machining support whose V journal profile, defined by the spaced, bearing element pairs, will always define precisely the same journal axis for those cylindrical profiles having a common diameter thus eliminating the introduction of those positioning errors inherent in the chucking and unchucking of tools or workpieces. Where diamonds are employed as the line contact bearing elements the possibility of wear is eliminated making it virtually impossible to introduce any positioning error into a Vee bearing. A more detailed discussion of the advantages inherent in the use of Vee bearings is contained in U.S. Pat. No. 3,679,273 whose disclosure is herein incorporated by reference.

The known disadvantages in conventional Vee bearing design vis-a-vis the use of a chuck or collet is that cylindrical profiles of different diameters could not, heretofore, be journaled in the same Vee bearing for rotation or reciprocation along a common centerline. Accordingly, it has previously been necessary to insure that the spindles of any tools which were to be interchanged in the same Vee bearing, for the performance of multiple machining operations along a common centerline, be of uniform diameter.

One purpose of the present invention is to provide, in a Vee bearing, the versatility of a chuck or collet as regards substitution of different size spindles while retaining the advantages of the Vee bearing in the avoidance of both static positioning and kinetic machining eccentricities necessarily inherent in any chucked tool. The foregoing is particularly important in micromachining because even those minor positioning errors and/or eccentricities inherent to chucked tools, which may be tolerated in macromachining, are multiplied beyond permissible tolerance ranges in the case of micromachining operations.

A further purpose of the invention is to expand the range of a conventional Vee bearing function in the use of the same to perform multiple machining operations along spaced, parallel centerlines without the necessity for repositioning either the workpiece or bearing. Exemplary of this latter conventional function is the drilling of spaced, inline holes by sequential substitution of different size drill spindles in the same fixed Vee bearing. When using a single fixed Vee bearing the number of inline holes that can be drilled without repositioning the workpiece is, of course, limited as a function of the desired hole spacing, the different size drill spindles available and the gross dimensions of the Vee bearing whereas, in accordance with the present invention, this particular range of usage is greatly amplified.

SUMMARY OF THE INVENTION

The principle of the adjustable Vee bearing wherein an individual one or ones of the four line contact bearing elements may be adjusted for the purpose of insuring the maintenance of a single V journal profile and its perpendicularity relative to a work surface was introduced by applicant's prior U.S. Pat. No. 3,679,273.

The concept herein presented is that of deliberately altering the V journal profile by like adjustment of all the bearing elements. The purpose is twofold. It permits a coaxial positionment of interchanged tools having different spindle diameters and multiplies the number of spaced, inline machining operations that may be conducted with a given number of different size spindles without repositioning either the bearing or workpiece.

Since the maintenance of a single V journal profile has always been assumed the one inviolate feature of a Vee bearing, the concept recognition that deliberate adjustment of the same to thereby open a new range of machining capabilities constitutes an important aspect of the invention whose achievement is made feasible by the means herein disclosed whereby such adjustments may be reproducibly effected within reasonable time limitations.

As will be apparent from the foregoing background discussion, the flat, line contact bearing surfaces of all four of the bearing elements defining the V journal profile must, at all times that a cylindrical profile is journaled therein, be the same distance from the centerline of the journaled profile. This, by definition, since it is the four flat bearing faces that define the V journal profile.

In a first embodiment of the invention, the bearing elements are collectively adjusted while, in a second embodiment, the bearing elements are individually adjusted a like distance.

DESCRIPTION OF THE DRAWINGS

FIG. 3 is a part sectional and part elevational view taken along line 3—3 of FIG. 2;

FIG. 4 is a view similar to FIG. 1 illustrating initial calibration of the bearing;

FIG. 5 is a top plan view, with parts broken away, of the Vee bearing shown in FIG. 1 illustrating the mounting of the collective adjustment fork;

DESCRIPTION OF THE PREFERRED EMBODIMENTS

Figure 1:
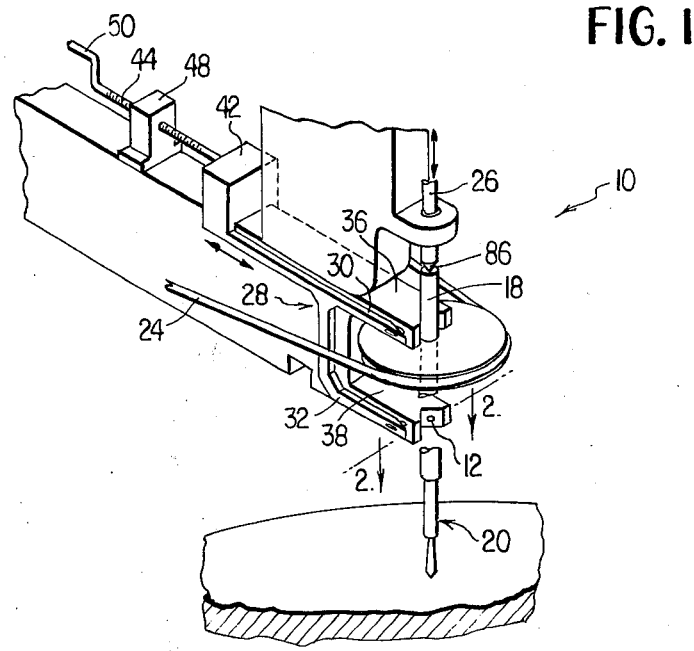
FIG. 1 is a fragmentary perspective view of a microdrill mounted for rotation and reciprocation in a Vee bearing having a collectively adjustable V profile.
Figure 2:
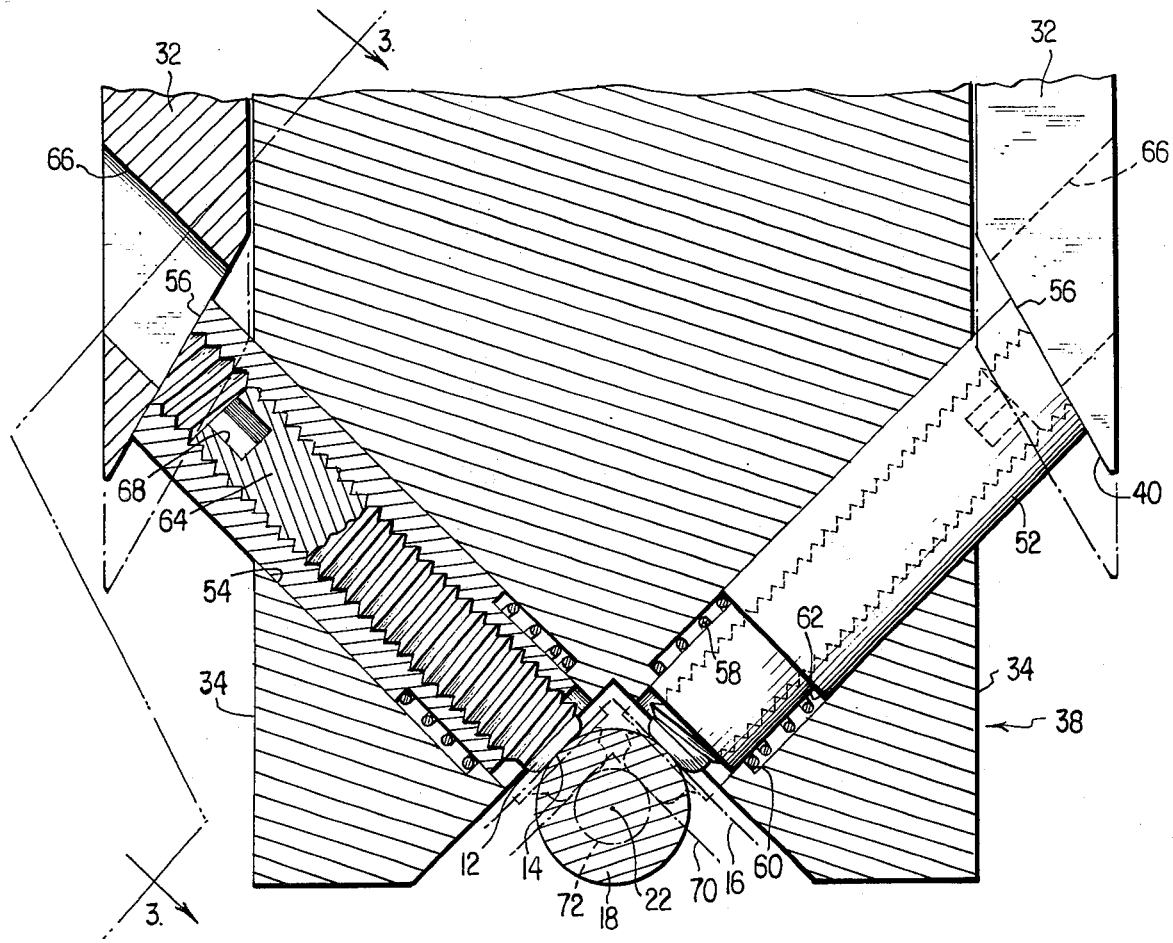
FIG. 2 is a horizontal Vee bearing taken along the line 2—2 of FIG. 1.
Figure 6:
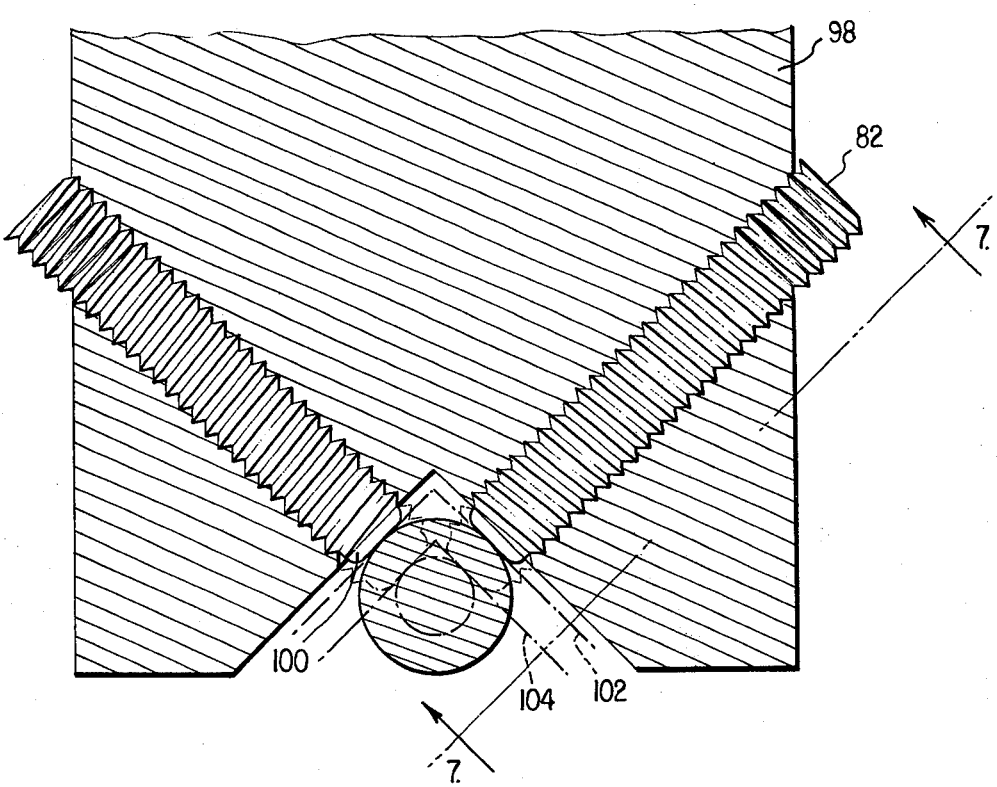
FIG. 6 is a horizontal Vee bearing section similar to the section of FIG. 2 but illustrating bearing elements mounted for individual adjustment in accordance with a second embodiment of the invention.

The Vee bearing 10, shown in FIGS. 1 and 2, include four jewel bearing elements 12 whose planar line contact bearing surfaces 14, together, define a V journal profile 16 in which the spindle 18 of a conventional microdrill 20 is journaled for rotation about, and infeeding reciprocation along, primary journal axis 22 under the respective influences of a drive belt 24 and infeed push rod 26.

Bearing elements 12 may comprise diamond or other jewel inserts of the type more specifically described in the aforesaid U.S. Pat. No. 3,679,273. The structure thus far described is entirely conventional and it will be appreciated that multiple tools may be interchanged in the bearing 10 to perform multiple machining operations along centerline 22 provided that the spindle diameter of each interchanged tool is equal to the diameter of spindle 18. A second conventional usage is the sequential interchange of tools, within the V profile 16, having different spindle diameters to thereby effect spaced, inline machining operations without repositioning of either the workpiece or bearing. The number of tools that can be interchanged in the V journal profile in this latter described conventional usage is limited as a function of the desired centerline spacings, the size tool spindles available and the gross dimensions of the Vee bearing.

The invention is predicated upon equal adjustment of all the bearing elements toward or away from an arbitrarily designated primary axis 22. The primary purpose is to permit the coaxial positionment of interchanged tools having different spindle diameters. A secondary purpose is to expand the usage range of a Vee bearing for conducting spaced, inline machining operations as described above.

In a first embodiment of the invention illustrated in FIGS. 1–5, the bearing elements 12 are collectively adjusted by reciprocal movement of collective adjusting fork 28 which includes upper and lower pairs of integrally connected legs 30, 32 slidably engaging the outer side edges 34 of the upper and lower Vee bearing legs 36, 38. The forward ends of adjusting fork legs 30, 32 are wedge shaped to define cam faces 40 while the rearward ends thereof are integrally connected with mounting block 42 for limited reciprocal adjustment therewith via lead screw 44 whose forward end terminates in a ball head 46 received in mounting block 42 as best shown in FIG. 5. Lead screw 44 is finely threaded intermediate its ends and extends through a correspondingly threaded bore in mounting bracket 48 rigid with Vee bearing 10. It will thus be apparent that rotation of screw 44, whether in automated fashion as by a tape controlled motor or by manual manipulation of a crank handle 50, results in the simultaneous forward or rearward movement of all four adjusting fork legs 30, 32. Upper and lower pairs of bearing element support sleeves 52 are reciprocably received in perpendicularly related, stepped mounting bore pairs 54 which open rearwardly through side edges 34 of the Vee bearing legs. The rearward ends of sleeves 52 are formed with cam faces 56 to coact with the complementary cam faces 40 on adjusting fork legs 32 as best illustrated in FIG. 2. The forward ends of sleeves 52 are necked down to receive compression springs 58 reacting between corresponding spring seat ledges 60, 62 in the stepped bore and on the bearing element support sleeves to urge the same rearwardly away from bearing axis 22. Each of the sleeves 52 is internally threaded for the receipt of a set screw 64 in the forward end of which line contact bearing element 12 is received in the manner more specifically described in U.S. Pat. No. 3,679,273. The wedge shaped forward ends of adjusting fork legs 30, 32 are traversed by elongate slots 66 through which a set screw adjusting tool, such as an Allen wrench, may be inserted. Slot 66 is of less width than the diameter of sleeve 52 and of such length as to insure that the set screw adjusting socket 68 is accessible throughout the full range of collective fork adjusting movement indicated by the solid and phantom lines in FIG. 2.

Adjusting fork 28 is of relatively massive construction and preferably machined as a conventional slide structure to extremely close tolerances to insure that the translational and angular relationships of all the cam faces 40 are maintained at all positions of adjustment. As will be apparent from an inspection of FIGS. 1, 2 and 5; rotation of lead screw 48 to translate adjusting fork 28 to the phantom line position of FIG. 2 results in the compression of springs 58 and equal forward movement of sleeves 52 through coacting cam faces 56, 40. The foregoing results in the definition of a new, and smaller, V journal profile 70 as the flat surfaces 14 of bearing elements 12 are collectively adjusted to the phantom line position of FIG. 2. With reference to FIG. 2, let it be assumed that a plurality of separate machining operations are to be conducted along the axis or centerline 22. Exemplary of the multiple machining operations that are conventionally performed is a progressive step tool change operation as fully described in U.S. Pat. No. 3,570,300 wherein an end mill tool is interchanged in the same bearing with a micropivot drill as illustrated at 20. Prior to the present invention it was necessary for the spindle of both the pivot drill and end mill to be of equal diameter to fit the fixed V profile of a Vee bearing. This has long been the recognized deficiency in a Vee bearing as compared with a chuck or collet which could accept spindles of different diameters for coaxial machining operations and was a substantial advantage from the standpoint of tooling inventory. As a specific example, if the interchange of two conventional microtools having spindles 18 and 72 of standard diameters of 0.400 inches and 0.250 inches, respectively is considered to be illustrated in FIG. 2, it will be apparent that intermediate positions of adjustment would permit an infinite number of different intermediate size spindle diameters to be journaled for rotation about axis 22.

Where it is desired to conduct machining operations along spaced, inline centerlines, the conventional procedure is to sequentially substitute tools having spindle diameters differing as a function of the desired spacing so that such operations may be performed without repositioning the workpiece or bearing. Assuming such operations to have been conducted with the V profile 16 it will be seen that a slight collective adjustment of the bearing elements toward the maximum phantom line position will permit the subsequent use of the same sequence of different tool spindles to extend the inline machining operations.

The Vee bearing is initially calibrated as illustrated in FIG. 4 to insure that the initially established V profile is perfectly perpendicular which necessarily insures that all of the bearing elements are in line contact engagement with the spindle. A gauging scribe 74 including a dummy spindle 76 having the same diameter as spindle 18 is supported in the bearing by a flexible dive belt such as shown at 24 in FIG. 1. After placing the gauging scribe in the bearing, a conventional feeler gauge 78 such as that manufactured by the L. S. Starrett Company, Athol, Massachusetts under model designation 711-F is fixedly positioned in any desired manner with the infeed arm 80 in light contact with the upper end of dummy spindle 76 to give a reading on indicator 78 of other than zero while scribe point 82 is in light contact with a horizontal flat surface 84. As the dummy spindle is slowly rotated, any variation between the axis defined by Vee bearing 10 and a perpendicular to surface 84 will, of course, be reflected on indicator 78 as the pressure contact with scribe point 82 varies during its 360° rotation. As the scribe point is slowly rotated and a discrepancy is noted, individual ones of the set screws 64 are adjusted in or out with an Allen wrench inserted through slot 66. Such individual adjustment is continued until a complete 360° rotation of the scribe point produces no deflection of indicator 78 at which time the initial calibration of the bearing to establish a perfect V profile which is perpendicular to a horizontal plane is completed. Thereafter, the set screws are locked in their adjusted position within adjusting sleeves 52 as by an adhesive or the like. When bearing elements 12 comprise diamonds, individual adjustment of the set screws will not again be required whereas if other type jewel inserts are used individual set screw adjustment may again be required to compensate for wear.

Following initial calibration to the solid line position of FIG. 2 in the manner just described to define V profile 16 and the use of the same to journal a tool spindle 18; if it then be desired to substitute a tool having a smaller spindle 72, lead screw 44 is rotated to advance adjusting fork 28 which, through the coaction of cam faces 40, 56 results in the collective movement of all four adjusting sleeves, and the bearing elements 12 supported thererin, to the phantom line position of FIG. 2 where the four flat bearing surfaces 14 will define a new V profile 70 to journal spindle 72 for rotation about axis 22.

In order to insure the proper adjustment of lead screw 44 to define the adjusted V profile 70; with the substituted spindle 72 held in the bearing by belt 24, lead screw 44 is adjusted until the point 86 of infeed push rod 26 aligns with a central reference mark on the upper end of spindle 72.

In the embodiment of FIGS. 6-9, the bearing elements are individuallly adjusted to vary the V profile. Set screws 88 are provided with axially milled slots 90 and circumferential perpendicularly related milled slots 92 of greater depth than the screw threads 94 of set screws 90. The milled slots 90 and 92 cooperate with an index mark 96 milled on the side of Vee bearing 98 to insure equal adjustment of the bearing elements 100.

Figure 7:
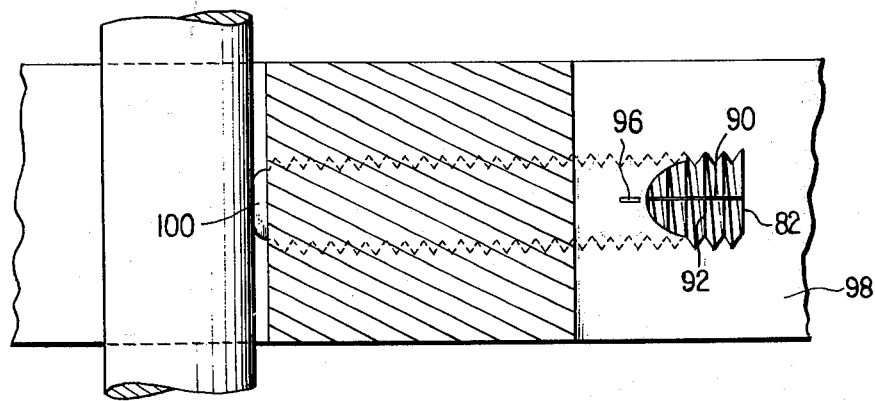
FIG. 7 is a sectional view taken along line 7—7 of FIG. 6 illustrating the use of milled indicia in effecting equal individual adjustment of each bearing element.
Figure 8:
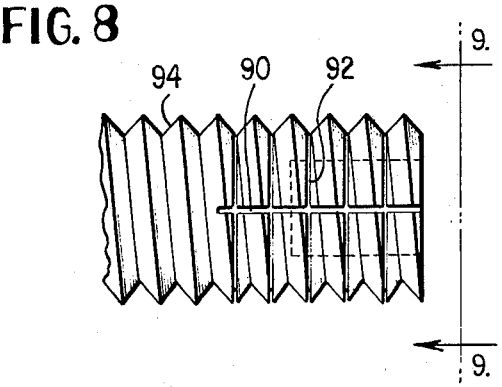
FIG. 8 is a fragmentary detail of one end of the adjusting set screw shown in FIG. 7.
Figure 9:
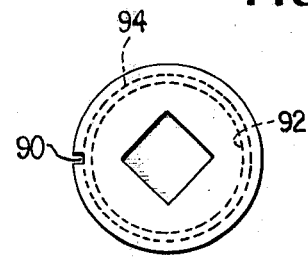
FIG. 9 is an end elevation of the set screw shown in FIG. 8.

In the FIG. 7 position it will be seen that the fifth circumferential slot 92 is just visible and the axial slot 90 is aligned with index mark 96. In order to assure absolute accuracy of individual positionment, it is preferred that the originally established V profile 102 be established as described in connection with FIG. 4 and the index mark 96 milled on the Vee bearing to correspond with the initially established position of axial slot 90. This will correct for any slight machining errors in the initial preparation of the set screws. The diameters of the set screws and the axial spacings between circumferential slots 92 are selected to provide those V profiles for the size spindles to be employed. Thus, for example, adjustment of all the set screws so that the third peripheral slot 92 is just exposed and the axial slot 90 aligned with index mark 96 would define V profile 104.

It will, of course, be understood that the repositionment of the negligible mass represented by the bearing elements and their adjusting means is in no way comparable to the readjustment of an inertial mass as represented by the Vee bearing or workpiece as regards the introduction of positioning errors.

I claim:
1. A Vee bearing having spaced bearing element pairs defining a V journal profile; said spaced bearing element pairs comprising diamond inserts having planar bearing surfaces; means for adjusting said V journal profile; said means including adjusting means for equal adjustment of said bearing surfaces toward and away from the journal axis of said V journal profile; said adjusting means including diamond insert mounting means mounted for movement toward and away from said axis; cooperating means on said diamond insert mounting means and said Vee bearing for insuring said equal adjustment of said bearing surfaces; and said cooperating means comprising cam means on said diamond insert mounting means and cooperating cam means mounted for equal collective movement relative to the diamond insert mounting means to insure equal collective adjustment of said bearing surfaces.

2. A Vee bearing having spaced bearing element pairs defining a V journal profile; said spaced bearing element pairs comprising diamond inserts having planar bearing surfaces; means for adjusting said V journal profile; said means including adjusting means for equal adjustment of said bearing surfaces toward and away from the journal axis of said V journal profile; said adjusting means including diamond insert mounting means mounted for movement toward and away from said axis; cooperating means on said diamond insert mounting means and said Vee bearing for insuring said equal adjustment of said bearing surfaces; and said cooperating means comprising indicial markings on said diamond insert mounting means and said Vee bearing to insure equal individual adjustment of said bearing surfaces.

3. A Vee bearing having spaced bearing element pairs including planar bearing surfaces defining a V journal profile having a journal axis; adjustable means mounting said bearing element pairs for movement of said planar bearing surfaces along adjustment axes perpendicular to said journal axis; and means on said Vee bearing for insuring equal movement of said bearing surfaces along said adjustment axes.

4. The Vee bearing of claim 3 wherein said last named means comprises a collective adjusting fork mounted for movement relative to said Vee bearing; and coacting cam means on said adjusting fork and said adjustable means for collectively effecting said equal movement.

5. The Vee bearing of claim 4 wherein said last named means comprises indicial markings on said Vee bearing; and said adjusting means including indicial markings positioned to coact with said first named indicial markings for individually insuring said equal movement.

6. A method of interchanging different cylindrical profiles within the same Vee bearing for rotation about a common axis, comprising; establishing a first V journal profile; journaling a first cylindrical profile in said first V journal profile for rotation about a first journal axis; removing said first cylindrical profile; establishing a second V journal profile; and journaling a second cylindrical profile in said second V journal profile for rotation about said first journal axis.

7. A method of conducting machining operations along spaced, parallel centerlines by adjustment of a Vee bearing V journal profile, comprising; establishing a first V journal profile; journaling a first cylindrical profile in said first V journal profile for rotation about a first journal axis; conducting a machining operation along said first journal axis; establishing a second V journal profile; journaling said first cylindrical profile in said second V journal profile for rotation about a second journal axis; and conducting a second machining operation along said second journal axis.

8. The method of claim 7 including the steps of interchanging a plurality of different cylindrical profiles and conducting a like plurality of machining operations along a like plurality of journal axes intermediate said first and second journal axes prior to establishing said second V journal profile.

* * * * *